United States Patent [19]
Vatne et al.

[11] Patent Number: 5,329,071
[45] Date of Patent: Jul. 12, 1994

[54] METHOD AND DEVICE FOR OPERATION OF EQUIPMENT INSTALLED IN MARINE SEISMIC TOWS

[75] Inventors: Odd O. Vatne, Oslo; Hans Cappelen, Blommenholm; Oyvind Sorbotten, Haugesund, all of Norway

[73] Assignee: Geco AS, Stavanger, Norway

[21] Appl. No.: 32,098

[22] Filed: Mar. 17, 1993

[30] Foreign Application Priority Data

Mar. 24, 1992 [NO] Norway ............................ 921154

[51] Int. Cl.⁵ .................................................. G01V 1/38
[52] U.S. Cl. ............................... 181/110; 367/16; 367/17
[58] Field of Search ......................... 367/16, 17, 18; 181/110; 114/245, 246

[56] References Cited

U.S. PATENT DOCUMENTS

| | | | |
|---|---|---|---|
| 3,774,570 | 11/1973 | Pearson | 367/17 |
| 3,794,965 | 2/1974 | Charske | 367/18 |
| 3,896,756 | 7/1975 | Pearson et al. | 367/17 |
| 4,193,129 | 3/1980 | Wiggins et al. | 367/106 |
| 4,912,684 | 3/1990 | Fowler | 367/16 |

*Primary Examiner*—Daniel T. Pihulic
*Attorney, Agent, or Firm*—Jacobson, Price, Holman & Stern

[57] ABSTRACT

A method and device for operating special equipment provided in seismic cables, i.e., gun cables and streamers (2, 3) during seismic surveys at sea, whereby energy is supplied through wires (4), or wireless transmitting-/receiving devices, to the equipment (B, C, D) in the cables, without this energy supply affecting the seismic surveys. In order to achieve this, low output energy (A) is supplied through wires (4, 17) to electrical units, such as a transformer (5) in a sealed chamber (9) used to charge batteries (6) in a separate sealed chamber (10) so that they can emit for brief periods sufficiently high outputs of energy in order to perform the necessary operation of the equipment such as motors (7) and fluid pumps (14). Control devices (13) are provided where required for control of the operation.

8 Claims, 1 Drawing Sheet

METHOD AND DEVICE FOR OPERATION OF EQUIPMENT INSTALLED IN MARINE SEISMIC TOWS

BACKGROUND OF THE INVENTION

The invention concerns a method and device for control and/or operation of equipment which is installed in marine seismic tows at a distance from a towing vessel, e.g. adjusting mechanisms for deflectors in the tow-line, tailbuoy streamers or electronic equipment, where the equipment is supplied with an energy source.

Seismic surveys at sea are conducted by towing through the water behind a vessel seismic devices which transmit seismic signal pulses to the seabed, and equipment to record the reflected signals. These seismic devices are normally placed in or along tow-lines which are pulled parallel to and at a distance from each other behind the towing vessel. The actual signal transmission for the seismic surveys is controlled in the usual way from the towing vessel by means of electrical or hydraulic trigger signals in the normal manner.

In seismic tows, however, there are a number of other elements which are more difficult to handle. Examples of such equipment are the deflectors or otter board devices which are used to pull tow-lines out to the side of the vessel and to position them in relation to the center line, where it is desirable to have adjusting mechanisms which, when activated, can effect an alteration in position in order to change the distance to other parallel tow-lines. The tow lines are also usually equipped with tailbuoys which contain equipment for recording their positions. Similar equipment can also be placed along the length of both the seismic gun cables as well as the receiver cables, the so-called streamers. The problems involved in the operation of such additional equipment in the cable have been due to the fact that this equipment has often required a relatively large power output for its operation, while it has not been possible to supply the required energy through the cables in the tow- lines, since greater amounts of energy could affect the other seismic equipment.

BRIEF SUMMARY OF THE INVENTION

The object of the present invent-ion is therefore to provide a method and also a device which facilitate the operation of such additional equipment in seismic streamers, enabling this equipment to function satisfactorily without the necessity of supplying energy amounts through the streamers which can affect the seismic surveys or recordings.

A further object of the invention is to facilitate the operation of equipment, which is operated both electrically and hydraulically, while at the same time safeguarding the equipment against environmental effects.

This object is achieved by a method and a device which are characterized by the features descried below.

In the method according to the invention it has been made possible for the energy transfer to the equipment to be kept at a low level, thus preventing a continuous energy supply from affecting the seismic recording devices in the tow. Despite this, by means of the use of chargeable batteries, the possibility is offered to have available at the operational site for the equipment an energy source which can supply a high power output when necessary, thus ensuring reliable operation of the equipment. The invention is concerned with brief operating periods when, e.g., an adjustment of a deflector is performed or it may involve the operation of electronic equipment in the streamer or in tailbuoys where, by means of the battery elements, continuous, uninterrupted operation is guaranteed with sufficient power, which is maintained by means of the weak, but continuous charge. The device according to the invention contains the elements required for operation and control of the operation. In order to safeguard these elements against external influences and possibly from influencing one another, the equipment is separated into two chambers both of which are sealed, where the first chamber contains the electrical and electronic equipment, while the second chamber contains the storage media, such as batteries and hydraulic accumulators. Gas from the batteries which could constitute a risk of explosion in their chamber will thus be less dangerous since the batteries are separated from the electrical components such as the motor and transformer which could cause an ignition spark. In the same way hydraulic leaks from the accumulator will be unable to reach the electrical motor and destroy it. This separation also enables the equipment to be positioned in a simpler and more flexible way, thus making it simpler to install in a deflector, a streamer, a tailbuoy etc. Should one of the elements nevertheless have to be replaced, it will be possible to disconnect the two chambers from each other, thus enabling separate replacements to be performed.

The device can also comprise transmitters and receivers for pulses controlling the operation, whereby the device receives a signal that an operation is required and sends this signal to the towing vessel which provides for the transmission of activating pulses for the operation of the equipment. Controls of this kind will be installed in the "electrical" first chamber. Many variations are possible of this type of equipment.

BRIEF DESCRIPTION OF THE DRAWINGS

In the following section the invention will be described in more detail by means of an embodiment which is illustrated purely schematically in the drawings wherein.

DETAILED DESCRIPTION

Figure 1:
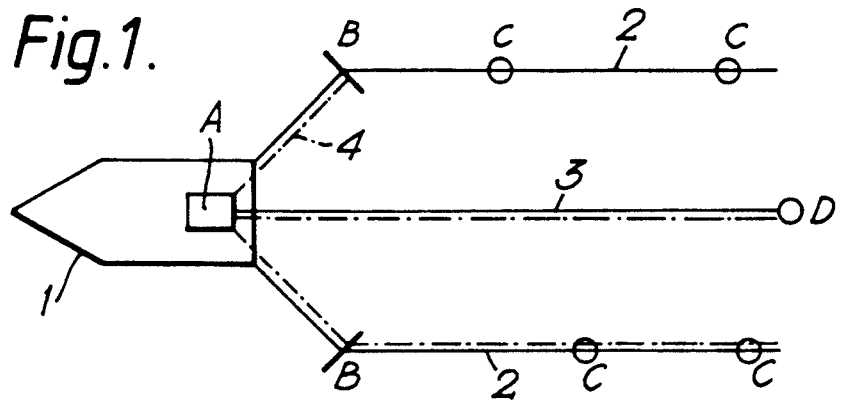
FIG. 1 is a schematic representation of the configuration of vessel and tow in seismic surveys.

FIG. 1 illustrates a seismic tow configuration, where a towing vessel 1 tows three cables 2 behind it, viz. two gun cables with a seismic energy source and a receiver cable or streamer 3 between the cables 2. The cables 2 are pulled out to the side by means of deflectors which are indicated by B. In order to adjust the position of these deflectors to enable the cable 2 to be moved further in or further out, it is desirable to use an operating device at or on the deflector. For this purpose a device according to the invention can be used. Similarly in the gun cables 2 at reference letters C there are indicated symbols for equipment. This can, e.g., be equipment for raising and lowering of the guns which are suspended from the cable or for the control of groups of guns. Devices according to the invention can be used for the operation of such equipment.

Finally, in the streamer 3 a tailbuoy is illustrated at D. This tailbuoy is capable of transmitting signals indicating its position, and if necessary the position can also be altered. Devices according to the invention can be used for this purpose.

In FIG. 1 dotted line 4 indicates the power supply wires to these operating devices. The power comes from a power source A on board the towing vessel, which can preferably carry a 24 volt voltage source which supplies a maximum current of 5 ampere. Thus low voltage current is led through the wires which are incorporated in the towed cables. Control cables for the operating devices can also be run together with these wires 4.

Figure 2:
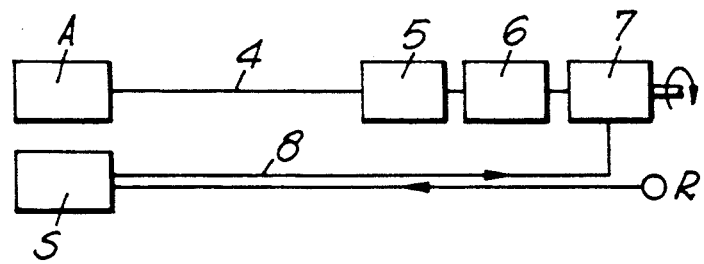
FIG. 2 is a block diagram illustrating the principles of the invention.

In FIG. 2 the principles used in the method and device according to the invention are illustrated in a block diagram. From the above-mentioned power source A of, e.g., 24 volts and maximum 5 ampere current intensity, current is led through the wires 4 to a transformer unit which is provided in the operating device, and which is indicated by 5. This transformer unit transforms the voltage to a level which is suited to the voltage storage unit provided in the operating device, and which is indicated by 6 in the figure. The transformer can, e.g., transform the voltage from 24 volts to 12 volts with a higher amperage. The transformer can be combined with a voltage regulator and possibly other regulators and switches as well as safety devices for the power supply. The batteries 6 receive a continuous power supply, if possible only during those periods when no seismic recordings are being performed. Continuous care is taken, however, to ensure that the battery 6 is full or charged to its maximum, thus ensuring that when adjustment or activation of the operation of the equipment is required, the battery 6 can supply sufficient energy to a motor 7 which provides the necessary activation, either directly or via a hydraulic unit or in some other way.

The control of this activation of the motor and its running time can be performed via a cable 8 which comes from a control unit on board the towing vessel and which in FIG. 2 is indicated by S. This control unit can receive impulses from a recording device, e.g. in the deflector, which effects the transmission of a control pulse from the unit S. This control mechanism can also be remotely controlled, e.g. by means of transmitting-/receiving units, the operating device also being capable of containing both a transmitter and a receiver in order to transmit signals back to the control unit on board the vessel.

Figure 3:
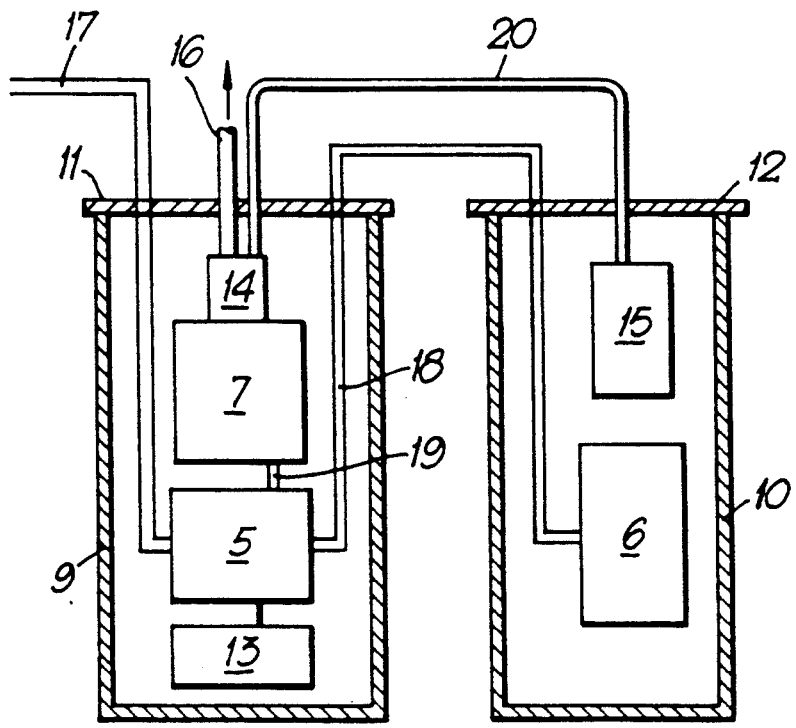
FIG. 3 is a schematic illustration of the construction of a device in accordance with the invention.

The device according to the invention is schematically illustrated in FIG. 3. The elements illustrated in FIG. 2 are here installed in sealed chambers. In order to make the operating device as safe as possible, the elements are arranged in at least two chambers, but more chambers could be used. In the illustrated embodiment it has been decided to install the electrical elements, control elements etc. in a first chamber, while the energy supplies are placed in a second separate chamber. These two chambers are indicated by 9 and 10 respectively. The chambers are sealed by means of covers 11 and 12. In the first chamber is placed a control unit 13, which, e.g., can be the above-mentioned remote-control unit, i.e. a transmitter and/or receiver for control signals for starting and stopping operations. The power supply from the towing vessel, i.e. from the energy source A, is transmitted via the cables 17, which are conveyed to the device via the tow-line's cable, and are connected to the transformer unit 5 which can also contain voltage regulators, switches, etc., and which transform the current from 24 volts to 12 volts. From this transformer unit a set of wires 18 leads to a chargeable battery 6 which is provided in the second chamber. The battery is thus more or less continuously charged with a 12 volt charging current. When operations are to commence, e.g. on the basis of a signal from the unit 13, a current is transmitted from the unit 5, possibly supplemented with current, or merely current from the battery 6 via the cable 18 through the cables 19 to the motor 7 which is an electrical motor and which thereby starts, e.g., a pump 14. The pump 14 is connected via a pressure pipe 20 with a supply of hydraulic fluid 15 which is sucked in by the pump and activates, e.g., a hydraulic cylinder via connection 16. In this manner a hydraulic cylinder in a deflector as described in Norwegian patent application No. 92 1155 can, for example, be activated or deactivated for adjustment of the deflector.

For other purposes the hydraulic elements, e.g., can be omitted. In this case a second chamber 10 would be available which contains only the chargeable battery. Should the battery for some reason be overloaded, thus causing the formation of gas, it will not be possible for this gas to ignite, since any sparks from the other electrical components are separately located in chamber 9.

The installation of the individual components in several chambers gives an extremely flexible construction, whereby individual components can be replaced quite simply by changing chambers, since the chambers require to be equipped with connectors of a known type, cables/hoses. The chambers can also be placed one behind the other or adapted in some other way for special purposes.

The above describes only the principles of the invention, the practical design being dependent on the various positions and possible applications. There will therefore be many natural modifications within the scope of the invention. The invention is particularly advantageous in combination with a remote control device, but can also be used in performing adjustments in advance, when activating pulses are only transmitted from the towing vessel.

We claim:
1. A device for operating equipment provided in marine, seismic tows remote from a towing vessel and towed by towing cables, said equipment including at least one of adjusting mechanisms for deflectors on said towing cables, devices for lowering and raising seismic guns, devices for use in tailbuoys in streamers, and electronic equipment, comprising;
    first sealed chamber means on said towing cable;
    second sealed chamber means on said towing cable separate and sealed from said first chamber means;
    low voltage chargeable power means in said first chamber means;
    charging means in said second chamber means operatively connected by electrical conduit means to said low voltage power means for charging said low voltage power means;
    electrically powered equipment operating means in said second chamber means electrically connected to said low voltage power means for operation thereby;
    control means in said second chamber means electrically connected to said charging means and equipment operating means for controlling operations of said means in said second chamber means and thereby controlling operation of said equipment; and central control means on said vessel for transmitting control signals to said control means in said second chamber means.

2. The device as claimed in claim 1 wherein:

said low voltage power means comprises rechargeable batteries;

said charging means comprises step down transformer means; and said central control means comprise a low voltage power source on said vessel having a higher voltage output than said batteries and control signal means on said vessel for transmitting control signals, and electrical conduit means supported by said towing cable connecting said low voltage power source and said control signal means to said transformer means and said control means in said second chamber means, so that transmission of electric power and control signals from said central control means does not effect operation of other devices in and on said towing cables.

3. The device as claimed in claim 1 wherein:

said central control means on said vessel comprises a transmitter/receiver means for transmitting control signals; and said control means in said second chamber means comprises a receiver/transmitter means for receiving said control signals from said central control means, so that signals from said central control means remotely control the operation of said equipment without effecting operation of other devices in said towing cable.

4. A method for control and operation of equipment in floating bodies in a towed cable of marine seismic tows remote from a towing vessel, the equipment including adjusting mechanisms for deflectors on the towed cable, tailbuoys, raising and lowering seismic guns, and electronic equipment, an energy source being provided on the towed cable for operating the equipment, the method comprising:

maintaining low power chargeable batteries as an energy source in a first sealed chamber;

maintaining a charging device electrically connected to said chargeable batteries in a separate second sealed chamber;

providing a control device in said second chamber electrically connected to said charging device for controlling the operation of said charging device;

remotely operating and controlling the operation of said control device in said second chamber by a central control unit on said vessel transmitting low power energy to said control device in said second chamber by electrical conducting wires supported by said towed cable for maintaining said chargeable batteries at maximum charge;

transmitting demand signals from said equipment to said central control unit indicating demands for power for operation of said equipment;

transmitting control signals from said central control unit to said control device in said second chamber in response to said equipment demand signals for operating said control device in said second chamber to provide electric power from said batteries to operate said equipment.

5. The method as claimed in claim 4 wherein:

at least one of said adjusting mechanisms comprises at least one hydraulic operating device on at least one of said equipment, a source of hydraulic fluid in said first chamber, and a hydraulic pump connected to said source of hydraulic fluid and pump drive motor therefore in said second chamber; and providing power from said batteries to said pump drive motor in response to a demand signal from said at least one of said equipment.

6. The device as claimed in claim 1 wherein at least one of said adjusting mechanisms comprises at least one hydraulic operating device on at least one of said equipment, and further comprising:

a source of hydraulic fluid in said first chamber means;

a hydraulic pump and pump drive motor therefor in said second chamber means;

fluid conducting means for conducting fluid from said hydraulic fluid source in said first chamber means to said hydraulic pump in said second chamber means; and wherein said control means in said second chamber means is electrically connected to said pump motor for operating said pump.

7. The device as claimed in claim 2 wherein at least one of said adjusting mechanisms comprises at least one hydraulic operating device on at least one of said equipment, and further comprising:

a source of hydraulic fluid in said first chamber means;

a hydraulic pump and pump drive motor therefor in said second chamber means;

fluid conducting means for conducting fluid from said hydraulic fluid source in said first chamber means to said hydraulic pump in said second chamber means; and wherein said control means in said second chamber means is electrically connected to said pump motor for operating said pump.

8. The device as claimed in claim 3 wherein at least one of said adjusting mechanisms comprises at least one hydraulic operating device on at least one of said equipment, and further comprising:

a source of hydraulic fluid in said first chamber means;

a hydraulic pump and pump drive motor therefor in said second chamber means;

fluid conducting means for conducting fluid from said hydraulic fluid source in said first chamber means to said hydraulic pump in said second chamber means; and wherein said control means in said second chamber means is electrically connected to said pump motor for operating said pump.

* * * * *